US010827441B2

(12) United States Patent
Loehr et al.

(10) Patent No.: US 10,827,441 B2
(45) Date of Patent: *Nov. 3, 2020

(54) POWER HEADROOM REPORT GENERATION

(71) Applicant: Lenovo (Singapore) PTE. LTD., New Tech Park (SG)

(72) Inventors: Joachim Loehr, Wiesbaden (DE); Ebrahim MolavianJazi, Lincolnwood, IL (US); Prateek Basu Mallick, Langen (DE); Ravi Kuchibhotla, Clarendon Hills, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 91 days.

This patent is subject to a terminal disclaimer.

(21) Appl. No.: 16/132,143

(22) Filed: Sep. 14, 2018

(65) Prior Publication Data

US 2019/0394732 A1 Dec. 26, 2019

Related U.S. Application Data

(60) Provisional application No. 62/687,622, filed on Jun. 20, 2018.

(51) Int. Cl.
*G01R 31/08* (2020.01)
*G06F 11/00* (2006.01)
(Continued)

(52) U.S. Cl.
CPC ....... *H04W 52/365* (2013.01); *H04L 25/0224* (2013.01); *H04W 72/042* (2013.01); *H04W 72/14* (2013.01); *H04W 80/02* (2013.01)

(58) Field of Classification Search
CPC . H04W 52/365; H04W 72/042; H04W 72/14; H04W 80/02; H04W 52/34;
(Continued)

(56) References Cited

U.S. PATENT DOCUMENTS 9,585,107 B2 * 2/2017 Xu ................ H04L 5/001
9,736,714 B2 * 8/2017 Zhao ............. H04W 24/10
(Continued)

FOREIGN PATENT DOCUMENTS

WO WO 2015/032023 * 12/2015 ........... H04W 24/00

OTHER PUBLICATIONS

Samsung, "Miscellaneous corrections", 3GPP TSG-RAN WG2 Meeting #102 R2-1809200, May 21-25, 2018, pp. 1-75.
(Continued)

*Primary Examiner* — Stephen M D Agosta
(74) *Attorney, Agent, or Firm* — Kunzler Bean & Adamson

(57) ABSTRACT

Apparatuses, methods, and systems are disclosed for power headroom report generation. One method includes aggregating multiple serving cells. The method includes determining that a power headroom report is triggered. The method includes determining that an uplink resource for a new transmission on a serving cell of the multiple serving cells is allocated at a first time after the power headroom report is triggered. The method includes determining a power headroom value for each serving cell of the multiple serving cells being activated based on information received prior to and including a predetermined time before the start of the uplink resource at the first time. The method includes generating a power headroom report medium access control control element including at least the power headroom value for each serving cell of the multiple serving cells being activated.

21 Claims, 8 Drawing Sheets

(51) Int. Cl.
*G08C 15/00* (2006.01)
*H04J 1/16* (2006.01)
*H04J 3/14* (2006.01)
*H04L 1/00* (2006.01)
*H04L 12/26* (2006.01)
*H04W 52/36* (2009.01)
*H04L 25/02* (2006.01)
*H04W 72/04* (2009.01)
*H04W 72/14* (2009.01)
*H04W 80/02* (2009.01)

(58) Field of Classification Search
CPC . H04W 52/146; H04W 24/10; H04W 52/367; H04W 52/242; H04W 72/0446; H04W 72/1284; H04L 25/0224; H04L 5/001; H04L 5/0098; H04L 5/0055; H04L 5/0053; H04L 5/0091; H04L 27/26; H04L 27/2601; H04L 27/2602
See application file for complete search history.

(56) References Cited

U.S. PATENT DOCUMENTS

| | | | | |
|---|---|---|---|---|
| 10,172,102 | B2* | 1/2019 | Lee | H04W 52/365 |
| 10,420,040 | B2* | 9/2019 | Dinan | H04W 52/246 |
| 2009/0238121 | A1* | 9/2009 | Kotecha | H04L 1/0026 |
| | | | | 370/329 |
| 2011/0243016 | A1* | 10/2011 | Zhang | H04W 52/365 |
| | | | | 370/252 |
| 2012/0044882 | A1* | 2/2012 | Kim | H04L 5/0058 |
| | | | | 370/329 |
| 2012/0113919 | A1* | 5/2012 | Kone | H04W 52/146 |
| | | | | 370/329 |
| 2012/0163322 | A1* | 6/2012 | Larmo | H04L 1/1854 |
| | | | | 370/329 |
| 2012/0294167 | A1* | 11/2012 | Zhu | H04W 52/146 |
| | | | | 370/252 |
| 2013/0070611 | A1* | 3/2013 | Ahn | H04W 52/286 |
| | | | | 370/241 |
| 2013/0070716 | A1* | 3/2013 | Kwon | H04L 5/0007 |
| | | | | 370/329 |
| 2013/0176953 | A1* | 7/2013 | Stern-Berkowitz | |
| | | | | H04W 52/146 |
| | | | | 370/329 |
| 2013/0229990 | A1* | 9/2013 | Fan | H04W 72/0486 |
| | | | | 370/329 |
| 2013/0258987 | A1* | 10/2013 | Chun | H04L 5/0032 |
| | | | | 370/329 |
| 2014/0211738 | A1* | 7/2014 | Park | H04W 52/18 |
| | | | | 370/329 |
| 2015/0098424 | A1* | 4/2015 | Li | H04W 72/04 |
| | | | | 370/329 |
| 2015/0131567 | A1* | 5/2015 | Fu | H04W 52/365 |
| | | | | 370/329 |
| 2015/0181539 | A1* | 6/2015 | Aiba | H04W 72/04 |
| | | | | 370/329 |
| 2015/0195797 | A1* | 7/2015 | Haim | H04W 52/365 |
| | | | | 455/522 |
| 2015/0327187 | A1* | 11/2015 | Lu | H04W 4/70 |
| | | | | 370/329 |
| 2016/0270094 | A1* | 9/2016 | Dinan | H04W 52/325 |
| 2016/0301513 | A1* | 10/2016 | He | H04L 5/001 |
| 2016/0373233 | A1* | 12/2016 | Pelletier | H04W 52/365 |
| 2018/0234927 | A1* | 8/2018 | Aiba | H04W 24/10 |
| 2018/0279339 | A1* | 9/2018 | Lohr | H04W 52/365 |
| 2018/0376434 | A1* | 12/2018 | Cui | H04W 72/1289 |
| 2019/0082399 | A1* | 3/2019 | Loehr | H04W 52/365 |

OTHER PUBLICATIONS

Lenovo et al., "PHR MAC CE format", 3GPP TSG-RAN WG2 Meeting #100 R2-1712916, Nov. 27-Dec. 1, 2017, pp. 1-3.
PCT/IB2018/001179, "Notification of Transmittal of the International Search Report and the Written Opinion of the International Searching Authority, or the Declaration", dated Mar. 13, 2019, pp. 1-11.
3GPP, "3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.1.0, Mar. 2018, pp. 1-109.
3GPP, "3rd Generation Partnership Project; Technical Specification Group Radio Access Network; NR; Medium Access Control (MAC) protocol specification (Release 15)", 3GPP TS 38.321 V15.1.0, Mar. 2018, pp. 1-67.
3GPP, "3rd Generation Partnership Project; Technical Specification Group Services and System Aspects; Procedures for the 5G System; Stage 2 (Release 15)", 3GPP TS 23.502 V1.2.0, Sep. 2017, pp. 1-165.
3GPP, "3rd Generation Partnership Project; Technical Specification Group Radio Access Network; Study on Scenarios and Requirements for Next Generation Access Technologies; (Release 14)", 3GPP TR 38.913 V14.2.0, Mar. 2017, pp. 1-38.
3GPP, "3rd Generation Partnership Project; Technical Specification Group Services and System Aspects; System Architecture for the 5G System; Stage 2 (Release 15)", 3GPP TS 23.501 V1.4.0, Sep. 2017, pp. 1-151.

* cited by examiner

500

| First PH Value | Second PH Value | Third PH Value |

| First PH Value | First V-field | Second PH Value | Second V-field | Third PH Value | Third V-field |

FIG. 6

POWER HEADROOM REPORT GENERATION

CROSS-REFERENCE TO RELATED APPLICATIONS

This application claims priority to U.S. patent application Ser. No. 62/687,622 entitled "POWER HEADROOM ELEMENT FORMATTING" and filed on Jun. 20, 2018 for Joachim Loehr, which is incorporated herein by reference in its entirety.

FIELD

The subject matter disclosed herein relates generally to wireless communications and more particularly relates to power headroom report generation.

BACKGROUND

The following abbreviations are herewith defined, at least some of which are referred to within the following description: Third Generation Partnership Project ("3GPP"), Positive-Acknowledgment ("ACK"), Access Point ("AP"), Binary Phase Shift Keying ("BPSK"), Buffer Status Report ("BSR"), Clear Channel Assessment ("CCA"), Code Division Multiple Access ("CDMA"), Control Element ("CE"), Cyclic Prefix ("CP"), Cyclical Redundancy Check ("CRC"), Channel State Information ("CSI"), Common Search Space ("CSS"), Control Resource Set ("CORESET"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), General Packet Radio Services ("GPRS"), Guard Period ("GP"), Global System for Mobile Communications ("GSM"), Hybrid Automatic Repeat Request ("HARQ"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Long Term Evolution ("LTE"), Multiple Access ("MA"), Medium Access Control ("MAC"), Multimedia Broadcast Multicast Services ("MBMS"), Modulation Coding Scheme ("MCS"), Machine Type Communication ("MTC"), massive MTC ("mMTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), New Radio ("NR"), Normal Uplink ("NUL"), Orthogonal Frequency Division Multiplexing ("OFDM"), Primary Cell ("PCell"), Physical Broadcast Channel ("PBCH"), Physical Downlink Control Channel ("PDCCH"), Packet Data Convergence Protocol ("PDCP"), Physical Downlink Shared Channel ("PDSCH"), Pattern Division Multiple Access ("PDMA"), Physical Hybrid ARQ Indicator Channel ("PHICH"), Power Headroom ("PH"), Power Headroom Report ("PHR"), Physical Layer ("PHY"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Access Network ("RAN"), Radio Resource Control ("RRC"), Random Access Procedure ("RACH"), Random Access Response ("RAR"), Radio Link Control ("RLC"), Radio Network Temporary Identifier ("RNTI"), Reference Signal ("RS"), Remaining Minimum System Information ("RMSI"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), Signal-to-Interference-Plus-Noise Ratio ("SINR"), System Information Block ("SIB"), Synchronization Signal ("SS"), Supplementary Uplink ("SUL"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("Wi-MAX").

In certain wireless communications networks, power headroom reports may be used. In such networks, power headroom reports may include various information.

BRIEF SUMMARY

Methods for power headroom report generation are disclosed. Apparatuses and systems also perform the functions of the apparatus. One embodiment of a method includes aggregating multiple serving cells. In some embodiments, the method includes determining that a power headroom report is triggered. In certain embodiments, the method includes determining that an uplink resource for a new transmission on a serving cell of the multiple serving cells is allocated at a first time after the power headroom report is triggered. In various embodiments, the method includes determining a power headroom value for each serving cell of the multiple serving cells being activated based on information received prior to and including a predetermined time before the start of the uplink resource at the first time. In one embodiment, the method includes generating a power headroom report medium access control control element including at least the power headroom value for each serving cell of the multiple serving cells being activated.

One apparatus for power headroom report generation includes a processor that: aggregates multiple serving cells; determines that a power headroom report is triggered; determines that an uplink resource for a new transmission on a serving cell of the multiple serving cells is allocated at a first time after the power headroom report is triggered; determines a power headroom value for each serving cell of the multiple serving cells being activated based on information received prior to and including a predetermined time before the start of the uplink resource at the first time; and generates a power headroom report medium access control control element including at least the power headroom value for each serving cell of the multiple serving cells being activated.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a schematic block diagram illustrating one embodiment of a power headroom report;

FIG. 6 is a schematic block diagram illustrating another embodiment of a power headroom report;

DETAILED DESCRIPTION

Figure 1:
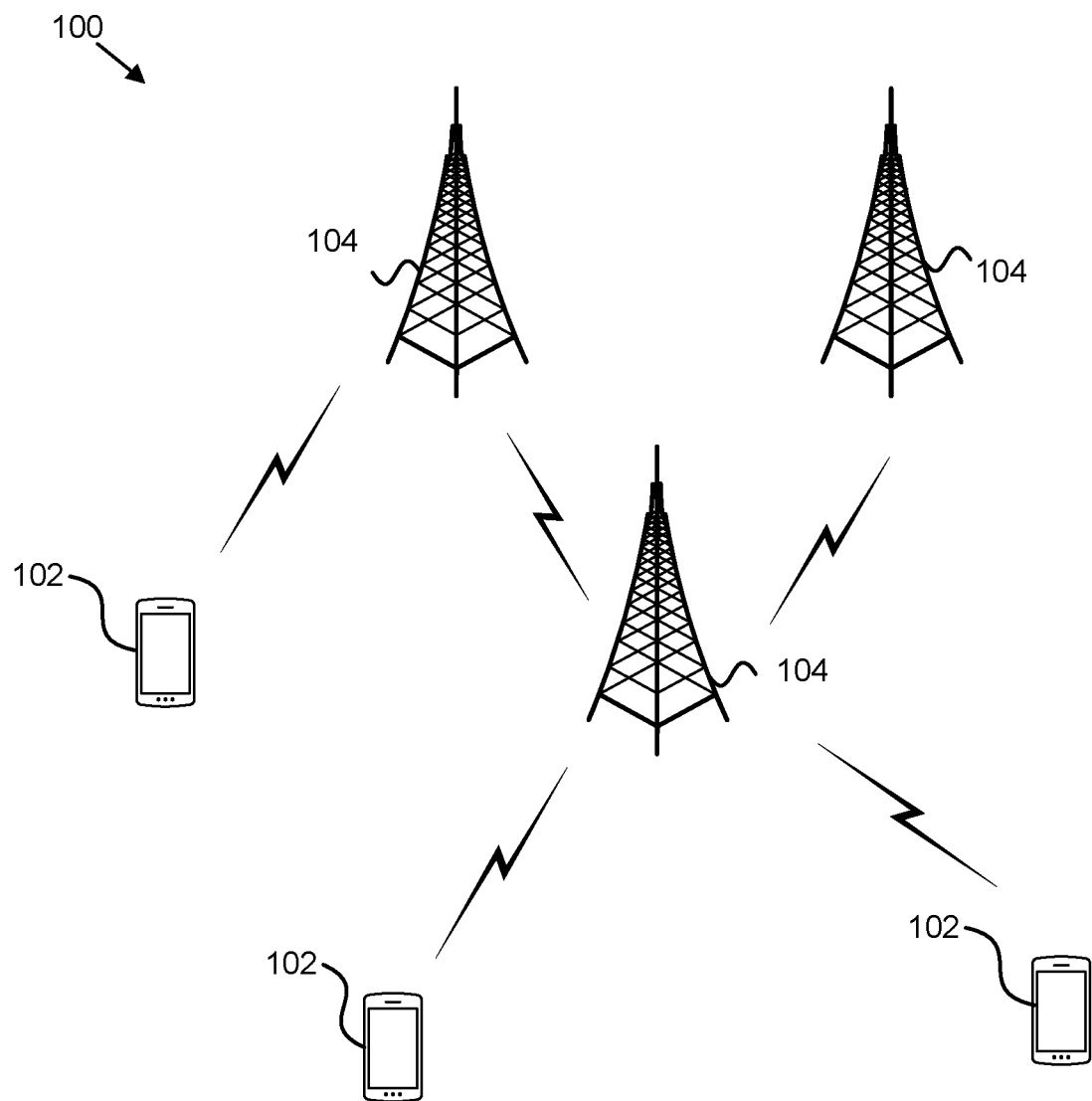
FIG. 1 is a schematic block diagram illustrating one embodiment of a wireless communication system for power headroom report generation and/or reception.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for power headroom report generation and/or reception. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may be used for power headroom report generation. The remote unit 102 may aggregate multiple serving cells. In some embodiments, the remote unit 102 may determine that a power headroom report is triggered. In certain embodiments, the remote unit 102 may determine that an uplink resource for a new transmission on a serving cell of the multiple serving cells is allocated at a first time after the power headroom report is triggered. In various embodiments, the remote unit 102 may determine a power headroom value for each serving cell of the multiple serving cells being activated based on information received prior to and including a predetermined time before the start of the uplink resource at the first time. In one embodiment, the remote unit 102 may generate a power headroom report medium access control control element including at least the power headroom value for each serving cell of the multiple serving cells being activated. Accordingly, the remote unit 102 may be used for power headroom report generation.

In certain embodiments, a network unit 104 may be used for power headroom report reception. In some embodiments, the network unit 104 may receive a power headroom report medium access control control element including a power headroom for each serving cell of multiple serving cells being activated. In such embodiments, the power headroom for a corresponding service cell is real or virtual. Accordingly, the network unit 104 may be used for power headroom report reception.

Figure 2:
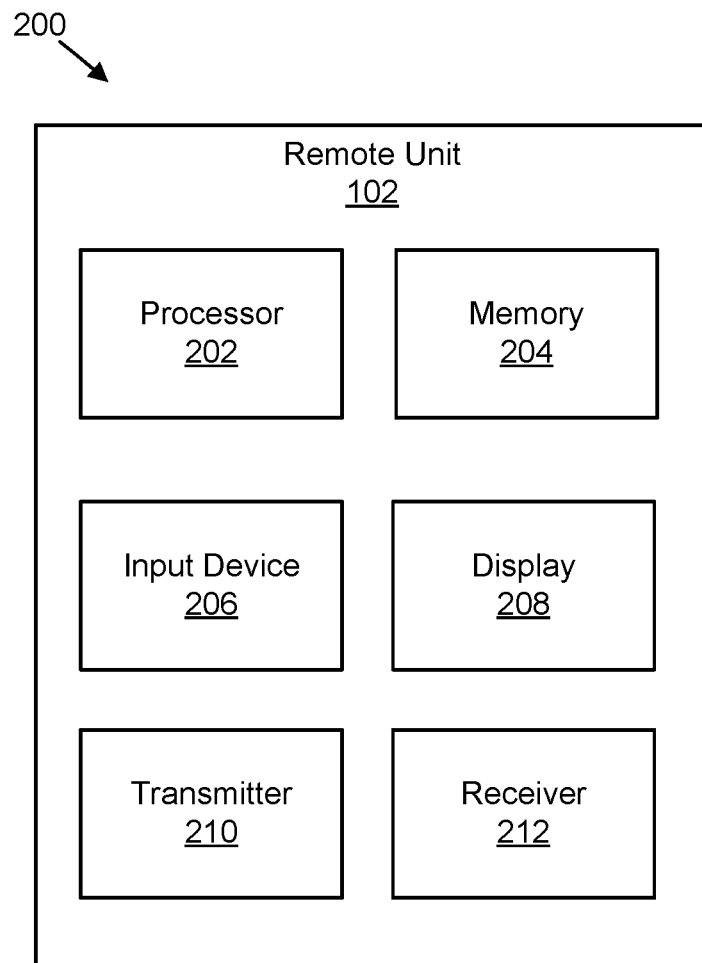
FIG. 2 is a schematic block diagram illustrating one embodiment of an apparatus that may be used for power headroom report generation.

FIG. 2 depicts one embodiment of an apparatus 200 that may be used for power headroom report generation. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: aggregate multiple serving cells; determine that a power headroom report is triggered; determine that an uplink resource for a new transmission on a serving cell of the multiple serving cells is allocated at a first time after the power headroom report is triggered; determine a power headroom value for each serving cell of multiple serving cells being activated based on information received prior to and including a predetermined time before the start of the uplink resource at the first time; and generate a power headroom report medium access control control element including at least a power headroom value for each serving cell of the multiple serving cells being activated. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
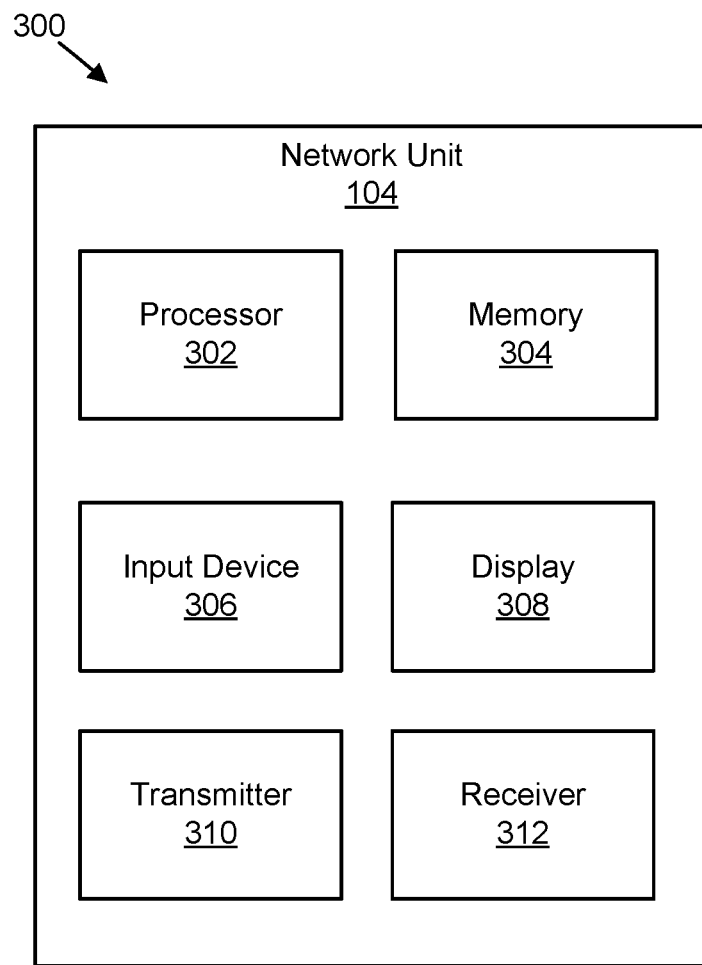
FIG. 3 is a schematic block diagram illustrating one embodiment of an apparatus that may be used for power headroom report reception.

FIG. 3 depicts one embodiment of an apparatus 300 that may be used for power headroom report reception. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 may receive a power headroom report medium access control control element including a power headroom for each serving cell of multiple serving cells being activated. In such embodiments, the power headroom for a corresponding service cell is real or virtual. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

To support various services (e.g., eMBB, URLLC, mMTC), 5G/NR may support different OFDM numerologies (e.g., SCS, CP length) in a single framework. As may be appreciated, various configurations for NR may have diverse requirements in terms of data rates, latency, and/or coverage. For example, eMBB may support certain data rates (e.g., 20 Gbps for downlink and 10 Gbps for uplink) and user-experienced data rates three times as much as is provided by IMT-Advanced systems. On the other hand, with URLLC, tighter requirements may be put on ultra-low latency (e.g., 0.5 ms for UL and DL each for user plane latency) and high reliability (e.g., $1-10^{-5}$ within 1 ms). Moreover, mMTC may use high connection density, large coverage in harsh environments, and an extremely long-life battery for low cost devices. Therefore, the OFDM numerology (e.g., SCS, OFDM symbol duration, CP duration, number of symbols per scheduling interval) that is suitable for one configuration may not work well for another. For example, low-latency services may use a shorter symbol duration (and thus larger SCS) and/or fewer symbols per scheduling interval (e.g., TTI) than an mMTC service. Furthermore, configurations with large channel delay spreads may use a longer CP duration than scenarios with short delay spreads. In some configurations, the SCS may be optimized to facilitate a specific CP overhead. In various embodiments, to support configurations in which different numerologies are applied across different carriers for a given remote unit 102 as well as different numerologies within the same carrier for a given remote unit 102, different OFDM numerologies may be multiplexed in a frequency-domain and/or a time-domain within the same carrier and/or across different carriers. This multiplexing may facilitate simultaneous support of services with vastly different requirements, e.g., ultra-low latency communications (short symbols and thus wide subcarrier spacing) and MBMS services (long symbols to enable long cyclic prefix and thus narrow subcarrier spacing).

In LTE, a TTI and a subframe may both correspond to a same time duration of 1 ms. Moreover, both may refer to a 1 ms period associated with different physical channels including a shortest possible interval between two PDCCH occasions, the duration of the transmission of a transport block on PDSCH or PUSCH, or the time-domain scheduling granularity. For NR however, a PDSCH or PUSCH duration for transmission of a transport block may vary between a mini-slot, a slot, or multiple slots. In addition, in some embodiments, a remote unit 102 may be configured to monitor a DL control channel in terms of slot or OFDM symbol with respect to a numerology of the DL control channel. Therefore, a remote unit 102 may be configured to monitor PDCCH on PDCCH monitoring occasions once every number of slots (e.g., on a subset of PDCCH monitoring candidates).

As used herein, TTI may refer to a time period (e.g., one or more OFDM symbols or slot) for which a remote unit 102 is configured to monitor a downlink control channel, a time period for which a remote unit 102 is configured to monitor PDCCH (on a specific CORESET), and/or a duration of a data transmission on PDSCH and/or PUSCH.

In various embodiments, to aggregate multiple serving cells and/or component carriers with different numerologies in NR, PHRs may be used. In some embodiments, a PHR may only be reported for activated serving cells with a configured uplink.

In LTE, a remote unit 102 may report an extended PHR for configurations including carrier aggregation (e.g., PH info for each activated serving cell with configured uplink may be included in a PH MAC CE). As may be appreciated, because a TTI length in LTE may be the same for all carriers, a PHR subframe (e.g., TTI which the PH information refers to) may be aligned across all component carriers and/or serving cells.

In NR, due to its support of different numerologies, a TTI of one component carrier and/or serving cell may overlap with multiple TTIs of another carrier (e.g., a TTI of eMBB on one carrier may overlap with a TTI of URLLC on another carrier). In some embodiments, a network unit 104 that receives an extended PHR may not be aware of which TTI a reported PH information refers to. For example, in a configuration in which an extended PHR report is triggered and subsequently transmitted in a TTI, which overlaps multiple TTIs on a different carrier, a network unit 104 may not know which of the overlapped TTI is a reference for the PH calculation. Accordingly, the network unit 104 may base its future scheduling decisions on wrong assumptions (e.g., how close a remote unit 102 is operating on a power limit) which may lead to power scaling issues and/or underutilization of resources.

In various embodiments, PHR in NR may have issues related to a size of a (extended) PHR MAC CE, i.e. PHR MAC CE containing power headroom information for multiple activated serving cells with configured uplink. Specifically, because NR may be used for very high data rate and low latency, a processing time available for both a transmitter and a receiver may be limited (e.g., for generating and/or decoding a TB). Therefore, L2 protocol functions for NR may be designed in a processing-power-friendly way. One example of this may be not supporting concatenation of data segments in an RLC layer. Not supporting concatenation of data segments in the RLC layer may enable preprocessing of both an RLC layer and a MAC layer before receiving an UL grant (e.g., PDCP SDU may be preconstructed to MAC SDU with its own MAC sub-header). Regarding the placement of MAC CEs, in various embodiments, UL MAC CEs may be placed at the end of a TB before any potential padding. This may be so that a transmitter may immediately start feeding part of the TB to PHY as soon as an UL grant is received. In configurations in which a MAC CE is placed at a beginning of a TB, a transmitter may need to wait until the MAC CE content is generated before the channel coding can start. In some embodiments, a computation of a BSR and PHR MAC CE may be done at a later point of time because both reflect a latest status before transmission (e.g., BSR may only be calculate after LCP has been finalized).

Because a size of an extended PHR MAC CE may not be fixed but may depend on a number of activated serving cells (with configured uplink) and also may depend on whether virtual or real PH is reported for a serving cell (Pcmax,c is not reported for a virtual PHR), generation of a TB from a processing timing perspective may be challenging for NR for configurations in which an extended PHR MAC CE is multiplexed in a TB. In certain embodiments, to generate a TB (e.g., during LCP) because MAC CEs are generally prioritized over data channels, a remote unit 102 may first reserve sufficient space within a TB for MAC CEs before assigning data to logical channels (e.g., data radio bearers). In various embodiments, in response to a size of MAC CEs only being known at a late point of time, an LCP procedure may be delayed. In certain embodiments, to determine a size of an extended PHR MAC CE for NR (e.g., at a time in which a remote unit 102 is aggregating multiple serving cells with different numerologies and/or TTI lengths), the remote unit 102 may determine whether a virtual uplink transmission or a real uplink transmission takes place on the serving cells in the TTI for which PH is reported. However, in some embodiments, for NR at a time in which different numerologies with different TTI length and/or timing relations are used on serving cells, a remote unit 102 may not know immediately (e.g., upon having received an UL grant) whether PH information for serving cells is calculated based on actual or virtual uplink transmission. Moreover, in certain embodiments, a size of a PHR MAC CE may not be known immediately, which may also mean that LCP may not be started immediately upon having received an UL grant.

In some embodiments, for configurations in which a remote unit 102 aggregates multiple NR component carriers and/or serving cells in order to be able to start an LCP procedure immediately upon having received an UL grant, the remote unit 102 may determine a size of an extended PHR MAC CE immediately upon having received an UL grant.

In one embodiment, a remote unit 102 may determine a size of an extended PHR MAC CE based on UL resource allocations, e.g., UL grants, received up until a point of time in which the remote unit 102 performs LCP. To be more specific, at a time in which a remote unit 102 receives an UL grant in TTI N and at least one PHR has been triggered, the remote unit 102 may consider all UL grants received for other activated serving cells, respectively UL component carriers, until and including TTI N for determining a size of the extended PHR MAC CE (e.g., for determining whether a PH value for a serving cell is determined based on real or virtual uplink transmission).

In various embodiments, a remote unit 102 may ignore any uplink grants scheduling an uplink transmission on the other activated serving cell in the TTI in which a PHR MAC CE is transmitted which is received later than TTI N for a determination of the PH information. Therefore, in certain embodiments, a remote unit 102 may determine at TTI N (upon having received an UL grant in TTI N which schedules an initial PUSCH transmission in TTI N+x including a (extended) PHR MAC CE) that a virtual PH will be computed for a serving cell (e.g., no uplink transmission takes place on that serving cell in a PHR reference subframe). In such embodiments, the remote unit 102 may report a virtual PHR for that serving cell even if an uplink transmission will be scheduled at a later point of time in the PHR reference subframe for that serving cell. As used herein, a PHR reference subframe, respectively PHR reference TTI, may refer to a specific subframe/TTI that is used as a reference point for a PHR. In other words, information in the PHR may be relative to a specific subframe/TTI (i.e., the PHR reference subframe). For example, in FIG. 4, subframes I and S are PHR reference subframes.

As may be appreciated, considering only UL grants for active serving cells received until and including a TTI in which an UL grant scheduling uplink resources for transmission of an extended PHR MAC CE has been received enables a remote unit 102 to determine a size of the extended PHR MAC CE immediately (e.g., like in LTE), which in turn enables the remote unit 102 to start a TB generation process immediately (e.g., by performing an LCP procedure).

Figure 4:
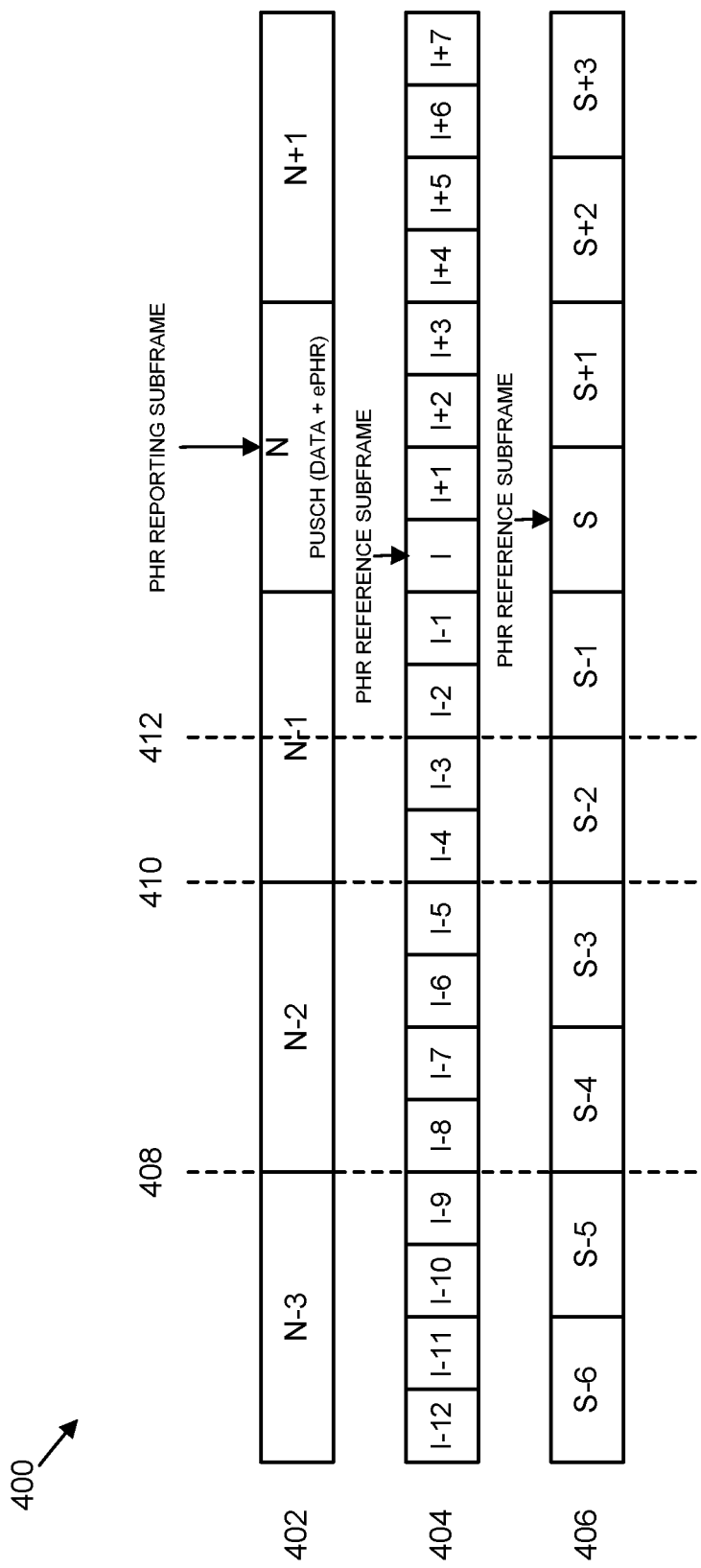
FIG. 4 is a schematic block diagram illustrating one embodiment of timing of multiple serving cells used for power headroom report generation.

FIG. 4 is a schematic block diagram illustrating one embodiment of timing 400 of multiple serving cells used for power headroom report generation. A first serving cell 402 (or carrier), a second serving cell 404 (or carrier), and a third serving cell 406 (or carrier) are illustrated.

In some embodiments, a remote unit 102 is configured with 3 component carriers and/or serving cells (in which are all 3 activated), each of them having a different numerology and/or TTI/slot length. In the illustrated embodiment of FIG. 4, the remote unit 102 is configured with the first serving cell 402, the second serving cell 404, and the third serving cell 406. In certain embodiments, PHR may be triggered before a first time 408 ("$t_0$") (e.g., during $TTI_{N-3}$ on the first serving cell 402) based on a predetermined criteria, and an extended PHR MAC CE may be transmitted in $TTI_N$ on the first serving cell 402 based on an UL grant received at $t_0$ in TTI N-2.

Upon receiving an UL grant at $t_0$ (TTI N-2 on the first serving cell 402) for the PHR reporting subframe N, the remote unit 102 may start with an LCP procedure in order to generate the TB. As may be appreciated, to determine a MAC SDU size of an LCH, a remote unit 102 may need to know a size of a PHR MAC CE (or extended PHR ("ePHR") MAC CE). However, because potential UL grants for a PHR reference subframe on the second serving cell 404 and the third serving cell 406 are received at a later point in time (e.g., at a second time 410 "$t_1$" and at a third time 412 "$t_2$" respectively), a remote unit 102 may not be able to determine at $t_0$ (e.g., TTI N-2) whether uplink transmissions take place on the second and third serving cells 404 and 406 in the PHR reference subframe (e.g., subframes I and S respectively). Therefore, the remote unit 102 may need to delay the LCP procedure, which might make it difficult to finalize generation of a TB (e.g., physical channel coding).

FIG. 5 is a schematic block diagram illustrating one embodiment of a power headroom report 500. In one embodiment, the power headroom report 500 may include a first PH value, a second PH value, and a third PH value. One or more of the PH values may be real (e.g., actual) PH values and/or one or more of the PH values may be virtual (e.g., calculated, estimated, etc.).

FIG. 6 is a schematic block diagram illustrating another embodiment of a power headroom report 600. In one embodiment, the power headroom report 600 may include a first PH value, a first v-field, a second PH value, a second v-field, a third PH value, and a third v-field. One or more of the PH values may be real (e.g., actual) PH values and/or one or more of the PH values may be virtual (e.g., calculated, estimated, etc.). The first v-field may correspond to the first PH value, the second v-field may correspond to the second PH value, and the third v-field may correspond to the third PH value. The v-field may indicate whether its corresponding PH value is real or virtual. For example, in one embodiment, the v-field may be one bit in which a logic "0" indicates that the corresponding PH value is real, and a logic "1" indicates that the corresponding PH value is virtual. In another embodiment, the v-field may be one bit in which a logic "1" indicates that the corresponding PH value is real, and a logic "0" indicates that the corresponding PH value is virtual.

Returning to FIG. 4, in some embodiments, a remote unit 102 may only consider UL grants received for activated component carriers and/or serving cells until and including $t_0$ (e.g., UL grants received until and including TTI N-2) to facilitate determining a size of an extended PHR MAC CE. Therefore, the remote unit 102 may determine at $t_0$ that a virtual PH value is to be computed and reported for the second serving cell 404 and the third serving cell 406, even if real uplink transmissions are to take place in a PH reference subframe (e.g., TTI i is the PHR reference subframe for the second serving cell scheduled in TTI i-2 on the second serving cell 404 and TTI s is the PHR reference subframe for the third serving cell scheduled in TTI s-2 on the third serving cell 406). In certain embodiments, a remote unit 102 may set field values of an extended PHR MAC CE based on a reception status at $t_0$ (e.g., the remote unit 102 sets a V-field for the second serving cell 404 and the third serving cell 406 to 1 indicating that the PH Value is based on a reference format (virtual PH)). In embodiments in which the V-field indicates a virtual PH, no $P_{CMAX,c}$ field may be reported for the second serving cell 404 and the third serving cell 406. Moreover, in such embodiments, the MAC may indicate to PHY that a virtual PH value should be calculated for the second serving cell 404 and the third serving cell 406.

In various embodiments, a remote unit 102 may determine a size of a triggered (e.g., extended) PHR MAC CE by considering only UL grants as well as transmissions on a PUCCH and grant-free uplink transmissions on activated serving cells until a predetermined time (e.g., reception of an UL grant which in turn triggers LCP procedure). By using the illustration of FIG. 4 for one example, a remote unit 102 may consider all UL grants received until to as well as a remote unit's 102 knowledge and/or status at $t_0$ regarding grant-free uplink transmissions and PUCCH transmissions occurring in PHR reference subframes on the activated serving cells/carrier for determining the size of a PHR MAC CE.

In some embodiments, a $P_{CMAX,c}$ field may not be included in an extended PHR MAC CE for a serving cell and/or a component carrier in an embodiment in which a PH value is based on a reference format (e.g., virtual PH). This may be because the $P_{CMAX,c}$ value for a virtual PH is known by a network unit 104 and doesn't need to be reported, thereby reducing signaling overhead. In certain embodiments, a remote unit 102 may always include a $P_{CMAX,c}$ field for an activated serving cell in an extended PHR MAC CE, even for embodiments in which a PH value for a serving cell is based on a reference format (e.g., virtual PH). Such embodiments may enable a remote unit 102 to know a size of an extended PHR MAC CE immediately upon having received an UL grant and thereby enables a remote unit 102 to start a TB generation process immediately (e.g., by performing LCP). In some embodiments, a remote unit 102 may be enabled to report a PH value according to an uplink transmission status in a PHR reference subframe and a V-flag may be set according to the transmitted PH information (e.g., virtual or real). In certain embodiments, a remote unit 102 may include the $P_{CMAX,c}$ field for the first serving cell 402, the second serving cell 404, and the third serving cell 406 in an extended PHR MAC CE. In some embodiments, processing power capabilities may enable a remote unit 102 to consider an UL grant received at $t_1$ for the second serving cell 404 for the generation of a TB scheduled at $t_0$. In such embodiments, the remote unit 102 may report a real PH (e.g., with V-flag set to 0) for the second serving cell 404 in the extended PHR MAC CE. In such embodiments, for the third serving cell 406, the remote unit 102 may report a virtual PHR (e.g., V-flag set to 1).

In various embodiments, a remote unit 102 may determine a size of a triggered (e.g., extended) PHR MAC CE by considering UL grants as well as transmissions on a PUCCH and grant-free uplink transmissions on activated serving cells until a defined time instance (e.g., reception of UL grant which in turn triggers LCP procedure). In some embodiments, a remote unit 102 may consider all UL grants received until to as well as the remote unit's 102 knowledge and/or status at to regarding grant-free uplink transmissions and PUCCH transmissions in PHR reference subframes for determining the size of a PHR MAC CE.

In various embodiments, a remote unit 102 may decide at $t_0$ (e.g., upon having received an UL grant on the first serving cell 402) to report a virtual PH value for the second serving cell 404 and the third serving cell 406 (e.g., because, according to the grant reception status at to, no uplink transmissions take place in the reference PHR subframes on the second serving cell 404 and the third serving cell 406). In some embodiments, in addition to an extended PHR MAC transmitted on the first serving cell 402, a remote unit 102 transmits a PHR MAC CE for the second serving cell 404 in a next uplink transmission taking place on the second serving cell 404 (e.g., in a PHR reference subframe), and transmits a PHR MAC CE for the third serving cell 406 in a next uplink transmission on the third serving cell 406. This may be because for both the second and third serving cells 404 and 406 only a virtual PHR is reported in the extended PHR MAC CE sent on the first serving cell 402. In such embodiments, the additional PHR MAC CEs may provide the network unit 104 with more detailed information about a remote unit's 102 power situation for the serving cells than what is conveyed with a virtual PHR.

In various embodiments, to support multiple open loop power control parameters a network unit 104 may configure multiple $P_0$ and/or $\alpha$ values (e.g., for specific combinations of one or more beams, UL waveforms, and/or service types). In certain embodiments, the network unit 104 may configure different power control parameters for URLLC and eMBB because both services have different QoS requirements. In some embodiments, for a PHR calculated based on a reference transmission and/or format (e.g., virtual PH), a network unit 104 may be aware of which uplink power control parameters a remote unit 102 uses for a virtual PHR calculation in order to interpret the received PH information correctly. Therefore, a predefined set of power control parameters (e.g., $P_0$, $P_{O\_PUSCH,c}$, and/or alpha value) may be used for calculation of a virtual PH.

In certain embodiments in which a network unit 104 configures multiple power control parameters, (e.g., multiple pairs of $P_0$ and $\alpha$) a remote unit 102 may use a first number of power control parameters of a set of configured power control parameters for a calculation of a virtual PH value. In some embodiments, a predefined TX beam or combination of beams and/or a predefined numerology may be used for computation of a virtual PH value (e.g., the PH value may be based on a reference format).

In one embodiment, a network unit 104 may configure multiple (e.g., open loop) power control parameters (e.g., $P_0$ and $\alpha$ values) for different service types. In such an embodiment, during a time in which a remote unit 102 performs logical channel multiplexing, (e.g., data of multiple LCHs is multiplexed in one TB) the remote unit 102 MAC may indicate a service with a highest logical channel priority to a PHY layer contained in the TB (e.g., according to LCP procedure). In some embodiments, the PHY selects open loop power control parameters based on indicated services from a MAC.

In certain embodiments, a remote unit 102 power class for centimeter wave ("CMW") and millimeter wave ("MMW") (e.g., above 24 GHz) may be considered Effective Isotropic Radiated Power ("EIRP"). In some embodiments, for an antenna radiation pattern measurement, if a single value of EIRP is given, this may be a maximum value of the EIRP over all measured angles. In certain embodiments, EIRP may be related to the power transmitted from a radio/PA ("$P_t$"), cable losses (e.g., possibly including antenna mismatch) "L", and antenna gain ("G") by the following formula: $EIRP = P_t - L + G$.

In various embodiments, cable losses L may be neglected because they are generally a small fraction of a dB. In some embodiments, Pcmax may be defined for above 24 GHz range in terms of EIRP that includes an antenna beam-forming gain. In certain RAN simulation assumptions, a remote unit 102 RX beam-forming gain may be included in RSRP measurements and thus in a path-loss calculation. In certain embodiments, it may be anticipated that power control equations for NR may be similar to those used for LTE. For example UL output power in dBm for PUSCH may be: $P_{PUSCH} = \min\{P_{cmax,c}, (P_{0,PUSCH} + \alpha PL) + 10 \log (M_{PUSCH}) + \Delta_{other} + f_c(i)\}$.

In some embodiments, as the path loss value PL may consider remote unit 102 RX beam-forming and/or antenna gain, there may be in a formula for the UL output power (e.g., for PUSCH, PUCCH, and/or SRS) an additional factor which represents TX antenna gain. In one specific embodiment, a difference between RX and TX antenna gain may be used in a power control formula. For embodiments in which RX and TX antenna gain are the same, a factor that represents TX antenna gain may be zero.

In certain embodiments, when computing a virtual PHR (e.g., PH value based on some reference format and/or transmission), a remote unit 102 may assume that TX antenna gain and RX antenna gain are the same (e.g., no correction factor may be considered). In another embodiment, a predefined TX antenna gain may be used for a computation of a virtual PHR (e.g., TX antenna gain and/or beam forming gain may be set to zero for a determination of a $P_{cmax}$ value and a corresponding PH value).

Various embodiments of extended PHR MAC CEs and corresponding field descriptions are described below.

$C_i$: this field may indicate a presence of a PH field for an SCell with SCellIndex i. In some embodiments, the $C_i$ field set to "1" may indicate that a PH field for the SCell with SCellIndex i is reported. In such embodiments, the $C_i$ field set to "0" may indicate that a PH field for an SCell with SCellIndex i is not reported.

R: this field may be for a reserved bit, and, in some embodiments, may be set to "0".

V: this field may indicate whether a PH value is based on a real transmission or a reference format (e.g., virtual). For a Type 1 PH, V=0 may indicate a real transmission on PUSCH and V=1 may indicate that a PUSCH reference format is used. For a Type 2 PH, V=0 may indicate a real transmission on PUCCH and V=1 may indicate that a PUCCH reference format is used. For a Type 3 PH, V=0 may indicate a real transmission on SRS and V=1 may indicate that an SRS reference format is used. Furthermore, for Type 1, Type 2, and Type 3 PH, V=0 may indicate a presence of an octet containing an associated $P_{CMAX,c}$ field, and V=1 may indicate that the octet containing the associated $P_{CMAX,c}$ field is omitted.

PH: this field may indicate a power headroom level. A length of the field may be 6 bits.

P: this field may indicate whether a MAC entity applies power backoff due to power management (e.g., as allowed by P-MPR$_c$). A MAC entity may set P=1 if a corresponding $P_{CMAX,c}$ field would have had a different value if no power backoff due to power management had been applied.

$P_{CMAX,c}$: if present, this field may indicate the $P_{CMAX,c}$ or $\tilde{P}_{CMAX,c}$ used for calculation of the preceding PH field.

In one embodiment, a remote unit 102 may determine whether a PH value for an activated serving cell (e.g., with a configured uplink) is based on a real transmission or a reference format by considering downlink control information (e.g., UL grants) which has been received (e.g., for the serving cell and/or other serving cells) until and including a PDCCH occasion/slot in which the remote unit 102 has received a first UL grant for an new and/or initial PUSCH transmission since a PHR has been triggered. In certain embodiments, reception of the first UL grant for an initial and/or new transmission and PHR triggering occurs at the same time (e.g., approximately the same time). In various embodiments, because a PHR is triggered in response to phr-ProhibitTimer expiring or being expired and the path loss has changed more than phr-Tx-PowerFactorChange dB for at least one activated serving cell of any MAC entity which is used as a pathloss reference since the last transmission of a PHR in this MAC entity at a time in which the MAC entity has UL resources for a new transmission, the triggering of a PHR and the reception of an UL grant allocating resource for a new transmission may occur at the same time (e.g., approximately the same time).

In some embodiment, downlink control information that is considered for determining whether a PHR is calculated based on a real transmission or a reference format may include physical layer grants (e.g., DCI formats allocating resources for PUSCH, PUCCH, and/or SRS transmission), as well as higher layer signaling (e.g., RRC signaling and/or MAC CE signaling allocating resources for PUSCH, PUCCH, and/or SRS transmission). In one example, only downlink control information instances are considered if corresponding uplink transmissions: (i) occur at and/or after the PHR trigger time instance; (ii) before and/or at the first symbol of the initial and/or new transmission that carries the PHR; and/or (iii) overlap either partially or completely with the initial and/or new transmission that carries the PHR. In certain embodiments, at a time of determining whether a type 1 PHR (e.g., PUSCH PHR) is based on a real PUSCH transmission or a reference format, the downlink control information considered by the remote unit 102 may be physical layer grants (e.g., DCI format 0_0 or DCI format 0_1) allocating PUSCH transmission dynamically and/or configured grants, where an uplink grant for PUSCH is provided by RRC and stored as a configured uplink grant. In various embodiments, for the determination of a PUCCH PHR (e.g., also referred to as type-2 PHR), a remote unit 102 may consider PUCCH transmissions which are either scheduled dynamically by means of physical layer signaling (e.g., ACK/NACK sent on PUCCH in response to receiving a PDCCH(DCI)+PDSCH) or allocated semi-statically by means of higher layer signaling (e.g., periodic CSI transmission on PUCCH). In certain embodiments, for an SRS PHR (e.g., also referred to as type-3 PHR), a remote unit 102 may consider RRC configurations for periodic SRS transmissions, MAC-CE signaling for semi-persistent SRS transmissions, and/or physical layer signaling (e.g., on a group-common signaling such as DCI format 2_3 in NR) for triggering aperiodic SRS transmissions at a time of determining whether a type-3 PHR is calculated based on actual SRS transmission or a reference format.

In various embodiments, a remote unit 102 may consider common control signaling received until a specific point in time (e.g., first UL grant received since PHR has been triggered) for the computation of a PHR value. In certain embodiments, a remote unit 102 may consider TPC commands signaled by DCI (e.g., DCI format 2_2) received until and including a PDCCH occasion in which the remote unit 102 has received a first UL grant for an initial PUSCH transmission since a PHR has been triggered in order to determine a PHR value.

In one embodiment, if a remote unit 102 receives multiple downlink control signaling for uplink transmission on a single serving cell (or uplink carrier) until and including a PDCCH occasion and/or slot in which the remote unit 102 has received a first UL grant for an initial PUSCH transmission since a PHR has been triggered, and more than one downlink control signaling has corresponding uplink transmissions that can be considered for real PHR calculation (e.g., based on which of the uplink transmissions: (i) occur at and/or after the PHR trigger time instance; (ii) before and/or at a first symbol of an initial and/or new transmission that carries the PHR; and/or (iii) overlap either partially or completely with the initial and/or new transmission that carries the PHR). In some embodiments, such as due to an out-of-order scheduling situation or when a number of RRC signalings, MAC-CE signalings, and/or DCI signalings relevant to PHR calculation exceeds one, then the remote unit 102 may have at least the following options regarding how to compute the PHR for a serving cell (or uplink carrier): (a) the downlink control signaling that arrives first; (b) the downlink control signaling that has a largest processing time; (c): the downlink control signaling in which uplink transmission comes first in time; (d) the downlink control signaling in which uplink transmission has the largest overlap in time with the initial PUSCH transmission that carries the PHR MAC CE; and/or (e) the downlink control signaling in which corresponding uplink transmissions occur in a first slot fully overlapping with the initial PUSCH transmission that carries the PHR MAC CE.

In one embodiment, in response to (i) downlink control information that is relevant to real PHR calculation for an activated serving cell (or uplink carrier) leading to multiple uplink transmissions (e.g., an SRS request field on group common DCI format 2_3 in NR triggers multiple SRS resource sets configured with that value for SRS request trigger field), (ii) uplink transmissions having different power control parameters, and/or (iii) more than one of those uplink transmissions can be considered for real PHR calculation (e.g., based on which of the uplink transmissions (i) occur at and/or after the PHR trigger time instance; (ii) before and/or at the first symbol of the initial and/or new transmission that carries the PHR; and/or (iii) overlap either partially or completely with the initial and/or new transmission that carries the PHR), then the remote unit 102 may have at least the following options regarding how to compute the PHR for that serving cell (or uplink carrier): (a) the uplink transmission that comes first in time; (b) the uplink transmission that has the largest overlap in time with the initial PUSCH transmission that carries the PHR MAC CE; and/or (c) the first uplink transmission that fully overlaps with the initial PUSCH transmission that carries the PHR MAC CE.

In certain embodiments, a remote unit 102 may consider a buffer status at some predefined specific time instance (e.g., PDCCH occasion and/or slot in which the first UL grant for a new transmission is received since PHR has been triggered) in order to determine whether a PHR is calculated based on an actual uplink transmission or based on some reference format. In various embodiments, even though the remote unit 102 may have some UL resources allocated for a slot for which PHR should be reported (e.g., allocated by a configured grant), if the remote unit 102 has no data in its uplink buffer for transmission, the remote unit 102 may skip the uplink transmission (e.g., perform no uplink transmission). Because the remote unit 102 cannot reliably predict a buffer status for a time and/or slot for which a PHR is reported, the remote unit 102 may take the buffer status at a predefined time instance (e.g., buffer status at the time when receiving the first UL grant for a new transmission since PHR has been triggered) for determining whether there will be some uplink transmission (e.g., whether PHR is based on actual transmission or reference format).

In various embodiments, in response to a first uplink allocation for a new transmission since a PHR has been triggered being allocated (e.g., by higher layer signalling for configured grant type 1) and there is no UL grant (e.g., DCI) received since the PHR has been triggered, a remote unit 102 may determine whether the PH value for an activated serving cell with a configured uplink is based on a real transmission or a reference format by considering the scheduling related downlink control information which has been received until and including the PDCCH occasion and/or slot which is some predefined number of ms (or a predefined and/or configured number of slots with respect to a certain numerology, e.g., the numerology of the active UL BWP, or as being based on the UE processing time value) before the UL resource in which the remote unit 102 sends the PHR MAC CE. In one embodiment, the remote unit 102 sends a virtual PHR for each activated serving cell with a configured uplink except for the serving cell on which the PHR MAC CE is transmitted.

In some embodiments, the remote unit 102 may determine whether a PH value for an activated serving cell with a configured uplink is based on a real transmission or a reference format by considering downlink control information which has been received until and including the PDCCH occasion and/or slot in which the remote unit 102 has received a first UL grant for a new and/or initial transmission since a PHR has been triggered. In various embodiments, the remote unit 102 may compute PH values and generate a PHR MAC CE (e.g., multiple entry PHR MAC CE) based on the status (e.g., received UL allocations and the remote unit's 102 buffer status) at a PDCCH occasion in which the first UL has been received since PHR has been triggered. In certain embodiments, the remote unit 102 may send a generated PHR MAC CE on an UL resource which is different than the UL resource allocated by the first UL grant for a new transmission which has been received since the PHR has been triggered. In such embodiments, the remote unit 102 may send the PHR MAC CE on a PUSCH resource which was allocated earlier than the first received UL grant since the PHR has been triggered. Moreover, in this embodiment, the first received UL for a new transmission since a PHR has been triggered may serve as a reference point for the calculation of the PHR MAC CE (e.g., the computation of the PH values) but the actual transmission of the PHR MAC CE may be done on a different UL resource respectively on a different serving cell (uplink carrier). In certain embodiments, if a remote unit 102 is configured with two UL carriers (e.g., NUL and SUL) on a serving cell without PUSCH and/or PUCCH configuration, if the remote unit 102 is configured to report only one PHR per serving cell, and/or if the remote unit 102 determines a Type 3 power headroom report for the serving cell based on a reference SRS transmission, the remote unit 102 may compute a Type 3 power headroom report for the serving cell assuming a reference SRS transmission on the UL carrier provided by higher layer parameter PUCCH-config. In some embodiments, if PUCCH-config is not configured on either of the two uplink carriers, the remote unit 102 may compute a Type 3 power headroom report for the serving cell assuming a reference SRS transmission on the NUL carrier.

In various embodiments, if a remote unit 102 is configured with multiple cells without PUSCH configuration but with SRS configuration, the remote unit 102 may not consider for computation of a Type 3 power headroom report in a first SRS transmission on active UL BWP $b_2$ of carrier $f_2$ serving cell $c_2$, a second SRS transmission on active UL BWP $b_2$ of carrier $f_2$ of serving cell $c_2$ that overlaps with the first SRS transmission if: the first SRS transmission is in response to detection of a first downlink control signaling; the second SRS transmission is in response to detection of a second downlink control signaling; and/or the remote unit 102 receives the second downlink control signaling after the PDCCH monitoring occasion and/or slot in which the remote unit 102 detects a first DCI format 0_0 or DCI format 0_1 for an initial transmission since a power headroom report was triggered.

Figure 7:
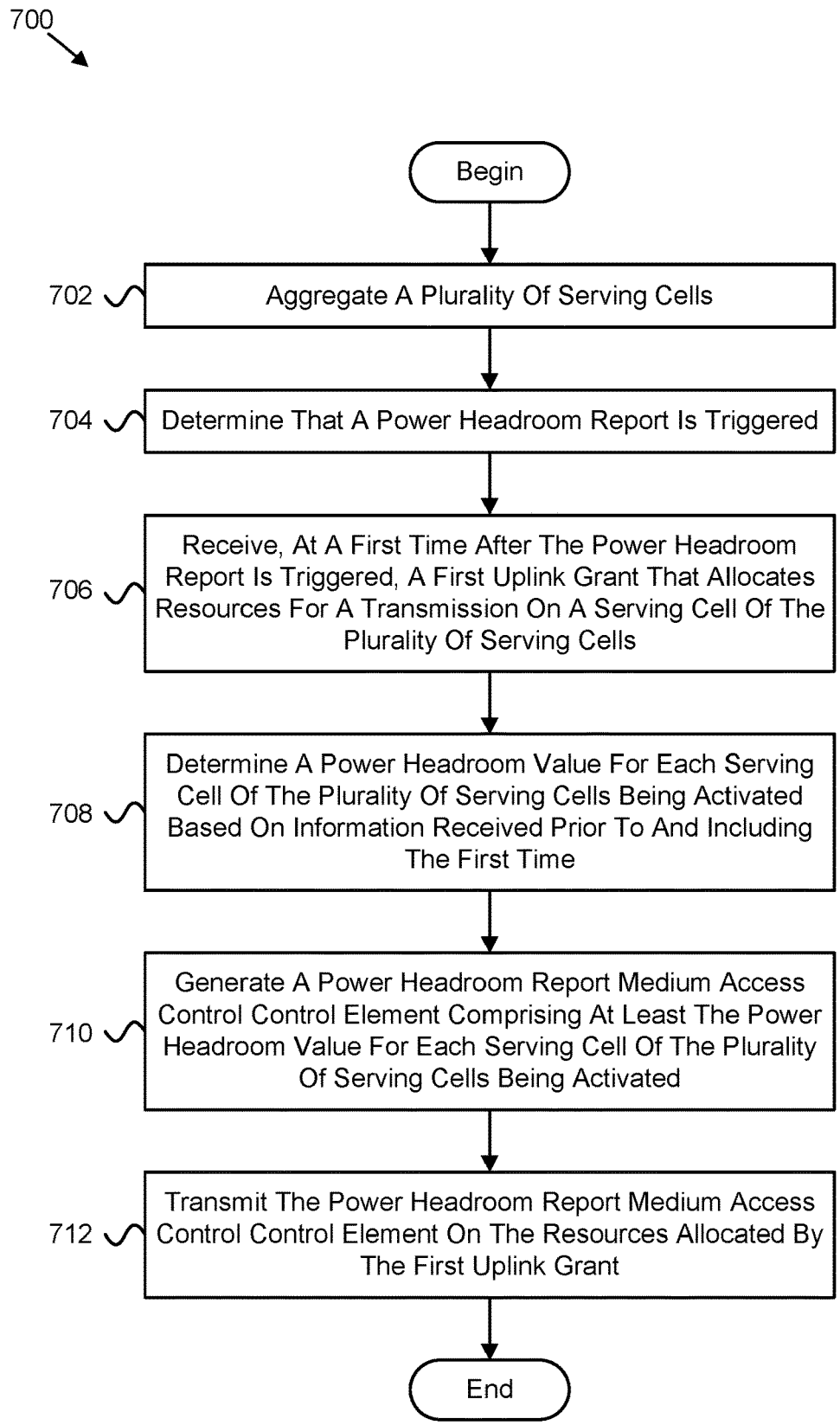
FIG. 7 is a flow chart diagram illustrating one embodiment of a method for power headroom report generation.

FIG. 7 is a flow chart diagram illustrating one embodiment of a method 700 for power headroom report generation. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include aggregating 702 multiple serving cells. In some embodiments, the method 700 includes determining 704 that a power headroom report is triggered. In certain embodiments, the method 700 includes receiving 706, at a first time after the power headroom report is triggered, a first uplink grant that allocates resources for an uplink transmission (e.g., a new transmission) on a serving cell of the multiple serving cells. In various embodiments, the method 700 includes determining 708 a power headroom value for each serving cell of the multiple serving cells being activated based on information received prior to and including the first time. In one embodiment, the method 700 includes generating 710 a power headroom report medium access control control element including at least the power headroom value for each serving cell of the multiple serving cells being activated. In some embodiments, the method 700 includes transmitting 712 the power headroom report medium access control control element on the resources allocated by the first uplink grant.

In certain embodiments, the information includes uplink related downlink control information. In some embodiments, the information includes an uplink resource allocation for a configured grant. In various embodiments, the first time corresponds to a physical downlink control channel occasion. In one embodiment, determining the power headroom value for each serving cell of the multiple serving cells being activated includes ignoring information received at a second time later than the first time.

In certain embodiments, determining the power headroom value for each serving cell of the multiple serving cells being activated includes determining whether the power headroom value for each serving cell of the multiple serving cells being activated is based on a real uplink transmission or a virtual uplink transmission. In some embodiments, the real uplink transmissions includes a transmission based on a received uplink grant. In various embodiments, the virtual uplink transmission includes a virtual transmission based on a reference format.

In one embodiment, the power headroom report medium access control control element includes an indicator corresponding to each serving cell of the multiple serving cells being activated, and the indicator indicates whether the power headroom value for a corresponding serving cell is real or virtual. In certain embodiments, the power headroom report includes a power headroom corresponding to each serving cell of the multiple serving cells being activated, and the power headroom for a corresponding serving cell is real or virtual. In some embodiments, the power headroom report is triggered in response to a timer expiring.

Figure 8:
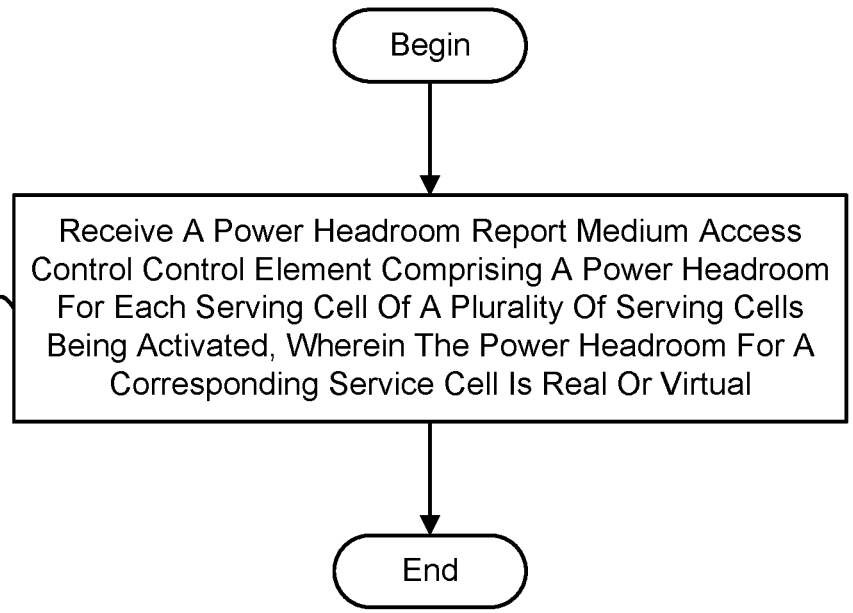
FIG. 8 is a flow chart diagram illustrating one embodiment of a method for power headroom report reception.

FIG. 8 is a flow chart diagram illustrating one embodiment of a method 800 for power headroom report reception. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

The method 800 may include receiving 802 a power headroom report medium access control control element including a power headroom for each serving cell of multiple serving cells being activated. In such embodiments, the power headroom for a corresponding service cell is real or virtual.

In certain embodiments, the power headroom report medium access control control element includes an indicator corresponding to each serving cell of the multiple serving cells being activated, and the indicator indicates whether the power headroom value for a corresponding serving cell is real or virtual. In some embodiments, the power headroom for a corresponding serving cell is real in response to a remote unit 102 performing an uplink transmission according to an uplink grant on the corresponding serving cell. In various embodiments, the power headroom for a corresponding serving cell is virtual in response to a remote unit not performing an uplink transmission on the serving cell according to an uplink grant.

Figure 9:
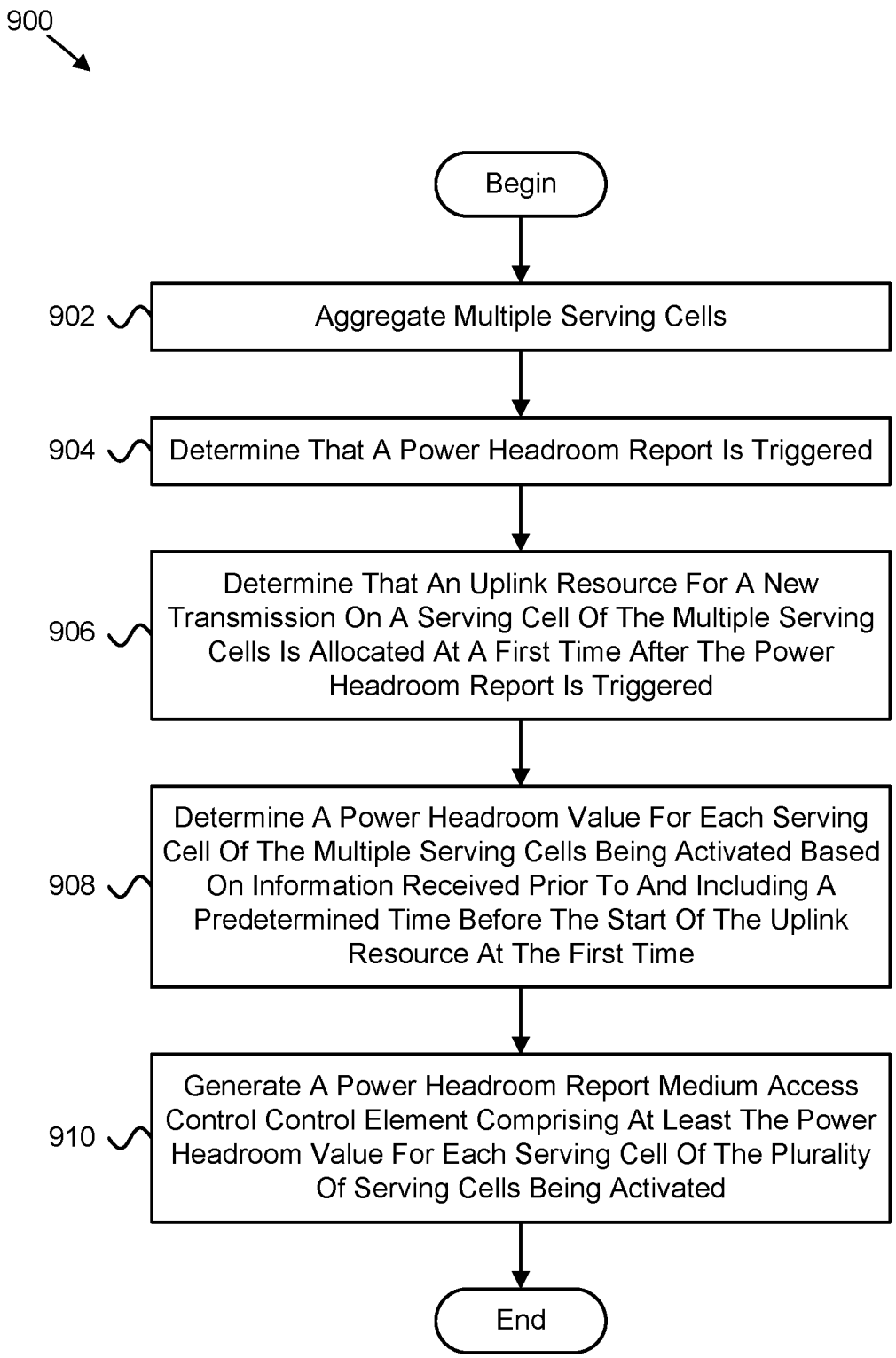
FIG. 9 is a flow chart diagram illustrating another embodiment of a method for power headroom report generation.

FIG. 9 is a flow chart diagram illustrating another embodiment of a method 900 for power headroom report generation. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include aggregating 902 multiple serving cells. In some embodiments, the method 900 includes determining 904 that a power headroom report is triggered. In certain embodiments, the method 900 includes determining 906 that an uplink resource for a new transmission on a serving cell of the multiple serving cells is allocated at a first time after the power headroom report is triggered. In various embodiments, the method 900 includes determining 908 a power headroom value for each serving cell of the multiple serving cells being activated based on information received prior to and including a predetermined time before the start of the uplink resource at the first time. In one embodiment, the method 900 includes generating 910 a power headroom report medium access control control element including at least the power headroom value for each serving cell of the multiple serving cells being activated.

In some embodiments, the predetermined time is a fixed number of slots, a fixed number of orthogonal frequency-division multiplexing symbols, or some combination thereof before the start of the uplink resource at the first time. In various embodiments, the predetermined time is a physical downlink control channel occasion in which an uplink grant is received, and the uplink grant allocates uplink resources for the new transmission at the first time after the power headroom report is triggered.

In one embodiment, the power headroom report medium access control control element is transmitted on the uplink resource at the first time. In certain embodiments, the information includes uplink related downlink control information. In some embodiments, the information includes an uplink resource allocation for a configured uplink grant. In various embodiments, the information includes physical layer grants, higher layer signaling, or some combination thereof. In one embodiment, the physical layer grants include uplink related downlink control information formats.

In various embodiments, the higher layer signaling includes uplink resource related radio resource control signaling, medium access control control element signaling, or some combination thereof. In some embodiments, the information includes uplink related downlink control information that has corresponding uplink transmissions that occur at the first time, occur after the first time, occur before a first symbol of the new transmission that carries the power headroom report, occur at the first symbol of the new transmission that carries the power headroom report, overlap the new transmission that carries the power headroom report, or some combination thereof. In certain embodiments, the information includes transmit power control commands signaled by downlink control information. In various embodiments, the uplink resource at the first time includes a configured uplink grant. In some embodiments, the first uplink allocation includes an allocation by higher layer signaling without receiving a first uplink grant. In certain embodiments, the first time is at a time in which the power headroom report is triggered. In various embodiments, the first time corresponds to a physical downlink control channel occasion.

In certain embodiments, determining the power headroom value for each serving cell of the multiple serving cells includes determining whether the power headroom value for each serving cell of the multiple serving cells being activated is based on a real uplink transmission or a virtual uplink transmission.

In some embodiments, determining the power headroom value for each serving cell of the multiple serving cells includes determining whether the power headroom value for each serving cell of the multiple serving cells being activated is based on a real uplink transmission or a reference format.

In one embodiment, the power headroom report medium access control control element includes an indicator corresponding to each serving cell of the multiple serving cells being activated, and the indicator indicates whether the power headroom value for a corresponding serving cell is real or virtual. In certain embodiments, the power headroom report includes a power headroom corresponding to each serving cell of the multiple serving cells being activated, and the power headroom for a corresponding serving cell is real or virtual. In some embodiments, the power headroom report is triggered in response to a timer expiring.

In one embodiment, a method comprises: aggregating a plurality of serving cells; determining that a power headroom report is triggered; receiving, at a first time after the power headroom report is triggered, a first uplink grant that allocates resources for a transmission (e.g., a new transmission) on a serving cell of the plurality of serving cells; determining a power headroom value for each serving cell of the plurality of serving cells being activated based on information received prior to and including the first time; generating a power headroom report medium access control control element comprising at least the power headroom value for each serving cell of the plurality of serving cells being activated; and/or transmitting the power headroom report medium access control control element on the resources allocated by the first uplink grant.

In certain embodiments, the information comprises uplink related downlink control information.

In some embodiments, the information comprises an uplink resource allocation for a configured grant.

In various embodiments, the first time corresponds to a physical downlink control channel occasion.

In one embodiment, determining the power headroom value for each serving cell of the plurality of serving cells being activated comprises ignoring information received at a second time later than the first time.

In certain embodiments, determining the power headroom value for each serving cell of the plurality of serving cells being activated comprises determining whether the power headroom value for each serving cell of the plurality of serving cells being activated is based on a real uplink transmission or a virtual uplink transmission.

In some embodiments, the real uplink transmission comprises a transmission based on a received uplink grant.

In various embodiments, the virtual uplink transmission comprises a virtual transmission based on a reference format.

In one embodiment, the power headroom report medium access control control element comprises an indicator corresponding to each serving cell of the plurality of serving cells being activated, and the indicator indicates whether the power headroom value for a corresponding serving cell is real or virtual.

In certain embodiments, the power headroom report comprises a power headroom corresponding to each serving cell of the plurality of serving cells being activated, and the power headroom for a corresponding serving cell is real or virtual.

In some embodiments, the power headroom report is triggered in response to a timer expiring.

In one embodiment, an apparatus comprises: a processor that: aggregates a plurality of serving cells; and determines that a power headroom report is triggered; a receiver that receives, at a first time after the power headroom report is triggered, a first uplink grant that allocates resources for a transmission (e.g., new transmission) on a serving cell of the plurality of serving cells; and/or a transmitter, wherein: the processor: determines a power headroom value for each serving cell of the plurality of serving cells being activated based on information received prior to and including the first time; and generates a power headroom report medium access control control element comprising at least the power headroom value for each serving cell of the plurality of serving cells being activated; and/or the transmitter transmits the power headroom report medium access control control element on the resources allocated by the first uplink grant.

In certain embodiments, the information comprises uplink related downlink control information.

In some embodiments, the information comprises an uplink resource allocation for a configured grant.

In various embodiments, the first time corresponds to a physical downlink control channel occasion.

In one embodiment, the processor ignores downlink control information allocating uplink resources received at a second time later than the first time for computation of the power headroom report.

In certain embodiments, the processor determines whether the power headroom value for each serving cell of the plurality of serving cells being activated is based on a real uplink transmission or a virtual uplink transmission.

In some embodiments, the real uplink transmission comprises a transmission based on a received uplink grant.

In various embodiments, the virtual uplink transmission comprises a virtual transmission based on a reference format.

In one embodiment, the power headroom report medium access control control element comprises an indicator corresponding to each serving cell of the plurality of serving cells being activated, and the indicator indicates whether the power headroom value for a corresponding serving cell is real or virtual.

In certain embodiments, the power headroom report comprises a power headroom corresponding to each serving cell of the plurality of serving cells being activated, and the power headroom for a corresponding serving cell is real or virtual.

In some embodiments, the power headroom report is triggered in response to a timer expiring.

In one embodiment, a method comprises: receiving a power headroom report medium access control control element comprising a power headroom for each serving cell of a plurality of serving cells being activated, wherein the power headroom for a corresponding service cell is real or virtual.

In certain embodiments, the power headroom report medium access control control element comprises an indicator corresponding to each serving cell of the plurality of serving cells being activated, and the indicator indicates whether the power headroom value for a corresponding serving cell is real or virtual.

In some embodiments, the power headroom for a corresponding serving cell is real in response to a remote unit performing an uplink transmission according to an uplink grant on the corresponding serving cell.

In various embodiments, the power headroom for a corresponding serving cell is virtual in response to a remote unit not performing an uplink transmission on the serving cell according to an uplink grant.

In one embodiment, an apparatus comprises: a receiver that receives a power headroom report medium access control control element comprising a power headroom for each serving cell of a plurality of serving cells being activated, wherein the power headroom for a corresponding service cell is real or virtual.

In certain embodiments, the power headroom report medium access control control element comprises an indicator corresponding to each serving cell of the plurality of serving cells being activated, and the indicator indicates whether the power headroom value for a corresponding serving cell is real or virtual.

In some embodiments, the power headroom for a corresponding serving cell is real in response to a remote unit performing an uplink transmission according to an uplink grant on the corresponding serving cell.

In various embodiments, the power headroom for a corresponding serving cell is virtual in response to a remote unit not performing an uplink transmission on the serving cell according to an uplink grant.

In one embodiment, a method includes: generating a power headroom report medium access control control element comprising at least a power headroom value for each serving cell of a plurality of serving cells being activated; and transmitting the power headroom report medium access control control element on resources allocated by a first uplink grant, wherein the power headroom value for at least one serving cell is a virtual power headroom value, and the virtual power headroom value is based on a reference transmission format.

In some embodiments, a method for computing a virtual power headroom report includes using predefined power control parameters from a set of configured power control parameters. In such embodiments, the predefined power control parameters may include $P_0$, $P_{O\_PUSCH,c}$, alpha, or some combination thereof. In certain embodiments, a method of computing a virtual power headroom report includes using the first configured power control parameter of each of the predefined power control parameters from the set of configured power control parameters. In various embodiments, a method for computing a virtual power headroom report includes using a predefined beam information for the computation of the virtual power headroom report.

In one embodiment, a method includes: aggregating a plurality of serving cells; determining that a power headroom report is triggered; determining that an uplink resource for a new transmission on a serving cell of the plurality of serving cells is allocated at a first time after the power headroom report is triggered; determining a power headroom value for each serving cell of the plurality of serving cells being activated based on information received prior to and including a predetermined time before the start of the uplink resource at the first time; and generating a power headroom report medium access control control element comprising at least the power headroom value for each serving cell of the plurality of serving cells being activated.

In certain embodiments, the predetermined time is a fixed number of slots, a fixed number of orthogonal frequency-division multiplexing symbols, or some combination thereof before the start of the uplink resource at the first time.

In some embodiments, the predetermined time is a physical downlink control channel occasion in which an uplink grant is received, and the uplink grant allocates uplink resources for the new transmission at the first time after the power headroom report is triggered.

In various embodiments, the power headroom report medium access control control element is transmitted on the uplink resource at the first time.

In one embodiment, the information comprises uplink related downlink control information.

In certain embodiments, the information comprises an uplink resource allocation for a configured uplink grant.

In some embodiments, the information comprises physical layer grants, higher layer signaling, or some combination thereof.

In various embodiments, the physical layer grants comprise uplink related downlink control information formats.

In one embodiment, the higher layer signaling comprises uplink resource related radio resource control signaling, medium access control control element signaling, or some combination thereof.

In certain embodiments, the information comprises uplink related downlink control information that has corresponding uplink transmissions that occur at the first time, occur after the first time, occur before a first symbol of the new transmission that carries the power headroom report, occur at the first symbol of the new transmission that carries the power headroom report, overlap the new transmission that carries the power headroom report, or some combination thereof.

In some embodiments, the information comprises transmit power control commands signaled by downlink control information.

In various embodiments, the uplink resource at the first time comprises a configured uplink grant.

In one embodiment, the first uplink allocation comprises an allocation by higher layer signaling without receiving a first uplink grant.

In certain embodiments, the first time is at a time in which the power headroom report is triggered.

In some embodiments, the first time corresponds to a physical downlink control channel occasion.

In various embodiments, determining the power headroom value for each serving cell of the plurality of serving cells comprises determining whether the power headroom value for each serving cell of the plurality of serving cells being activated is based on a real uplink transmission or a virtual uplink transmission.

In one embodiment, the power headroom report medium access control control element comprises an indicator corresponding to each serving cell of the plurality of serving cells being activated, and the indicator indicates whether the power headroom value for a corresponding serving cell is real or virtual.

In certain embodiments, the power headroom report comprises a power headroom corresponding to each serving cell of the plurality of serving cells being activated, and the power headroom for a corresponding serving cell is real or virtual.

In some embodiments, the power headroom report is triggered in response to a timer expiring.

In various embodiments, determining the power headroom value for each serving cell of the multiple serving cells includes determining whether the power headroom value for each serving cell of the multiple serving cells being activated is based on a real uplink transmission or a reference format.

In one embodiment, an apparatus includes: a processor that: aggregates a plurality of serving cells; determines that a power headroom report is triggered; determines that an uplink resource for a new transmission on a serving cell of the plurality of serving cells is allocated at a first time after the power headroom report is triggered; determines a power headroom value for each serving cell of the plurality of serving cells being activated based on information received prior to and including a predetermined time before the start of the uplink resource at the first time; and generates a power headroom report medium access control control element comprising at least the power headroom value for each serving cell of the plurality of serving cells being activated.

In certain embodiments, the predetermined time is a fixed number of slots, a fixed number of orthogonal frequency-division multiplexing symbols, or some combination thereof before the start of the uplink resource at the first time.

In some embodiments, the predetermined time is a physical downlink control channel occasion in which an uplink grant is received, and the uplink grant allocates uplink resources for the new transmission at the first time after the power headroom report is triggered.

In various embodiments, the power headroom report medium access control control element is transmitted on the uplink resource at the first time.

In one embodiment, the information comprises uplink related downlink control information.

In certain embodiments, the information comprises an uplink resource allocation for a configured uplink grant.

In some embodiments, the information comprises physical layer grants, higher layer signaling, or some combination thereof.

In various embodiments, the physical layer grants comprise uplink related downlink control information formats.

In one embodiment, the higher layer signaling comprises uplink resource related radio resource control signaling, medium access control control element signaling, or some combination thereof.

In certain embodiments, the information comprises uplink related downlink control information that has corresponding uplink transmissions that occur at the first time, occur after the first time, occur before a first symbol of the new transmission that carries the power headroom report, occur at the first symbol of the new transmission that carries the power headroom report, overlap the new transmission that carries the power headroom report, or some combination thereof.

In some embodiments, the information comprises transmit power control commands signaled by downlink control information.

In various embodiments, the uplink resource at the first time comprises a configured uplink grant.

In one embodiment, the first uplink allocation comprises an allocation by higher layer signaling without receiving a first uplink grant.

In certain embodiments, the first time is at a time in which the power headroom report is triggered.

In some embodiments, the first time corresponds to a physical downlink control channel occasion.

In various embodiments, the processor determining the power headroom value for each serving cell of the plurality of serving cells comprises the processor determining whether the power headroom value for each serving cell of the plurality of serving cells being activated is based on a real uplink transmission or a virtual uplink transmission.

In one embodiment, the power headroom report medium access control control element comprises an indicator corresponding to each serving cell of the plurality of serving cells being activated, and the indicator indicates whether the power headroom value for a corresponding serving cell is real or virtual.

In certain embodiments, the power headroom report comprises a power headroom corresponding to each serving cell of the plurality of serving cells being activated, and the power headroom for a corresponding serving cell is real or virtual.

In some embodiments, the power headroom report is triggered in response to a timer expiring.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
aggregating a plurality of serving cells;
determining that a power headroom report is triggered;
determining that an uplink resource for a new transmission on a serving cell of the plurality of serving cells is allocated at a first time after the power headroom report is triggered, wherein the uplink resource for the new transmission allocated at the first time is a configured grant;
determining a power headroom value for each serving cell of the plurality of serving cells being activated based on information received prior to and including a predetermined time before the start of the uplink resource at the first time, wherein the information comprises downlink control information, higher layer signaling for configured grants, an uplink resource allocation for the configured grants, and signaling for sounding reference signal transmissions;
generating a power headroom report medium access control control element comprising at least the power headroom value for each serving cell of the plurality of serving cells being activated; and
transmitting the power headroom report medium access control control element on the uplink resource allocated at the first time.

2. The method of claim 1, wherein the predetermined time is a fixed number of slots, a fixed number of orthogonal frequency-division multiplexing symbols, or some combination thereof before the start of the uplink resource at the first time.

3. The method of claim 1, wherein the predetermined time is a physical downlink control channel occasion in which an uplink grant is received, and the uplink grant allocates uplink resources for the new transmission at the first time after the power headroom report is triggered.

4. The method of claim 1, wherein the information comprises uplink related downlink control information.

5. The method of claim 1, wherein the information comprises physical layer grants, higher layer signaling, or some combination thereof.

6. The method of claim 5, wherein the physical layer grants comprise uplink related downlink control information formats.

7. The method of claim 5, wherein the higher layer signaling comprises uplink resource related radio resource control signaling, medium access control control element signaling, or some combination thereof.

8. The method of claim 1, wherein the information comprises uplink related downlink control information that has corresponding uplink transmissions that occur at the first time, occur after the first time, occur before a first symbol of the new transmission that carries the power headroom report, occur at the first symbol of the new transmission that carries the power headroom report, overlap the new transmission that carries the power headroom report, or some combination thereof.

9. The method of claim 1, wherein the information comprises transmit power control commands signaled by downlink control information.

10. The method of claim 1, wherein the first uplink allocation comprises an allocation by higher layer signaling without receiving a first uplink grant.

11. The method of claim 1, wherein the first time is at a time in which the power headroom report is triggered.

12. The method of claim 1, wherein the first time corresponds to a physical downlink control channel occasion.

13. The method of claim 1, wherein determining the power headroom value for each serving cell of the plurality of serving cells comprises determining whether the power headroom value for each serving cell of the plurality of serving cells being activated is based on a real uplink transmission or a reference format.

14. The method of claim 1, wherein the power headroom report medium access control control element comprises an indicator corresponding to each serving cell of the plurality of serving cells being activated, and the indicator indicates whether the power headroom value for a corresponding serving cell is real or virtual.

15. The method of claim 1, wherein the power headroom report comprises a power headroom corresponding to each serving cell of the plurality of serving cells being activated, and the power headroom for a corresponding serving cell is real or virtual.

16. The method of claim 1, wherein the power headroom report is triggered in response to a timer expiring.

17. The method of claim 1, wherein the predetermined time is a user equipment processing time value for preparation of a physical uplink shared channel transmission.

18. The method of claim 1, wherein determining the power headroom value for each serving cell of the plurality of serving cells being activated comprises determining whether the power headroom value for each serving cell of the plurality of serving cells being activated is based on a real uplink transmission or a reference format.

19. The method of claim 1, wherein the information comprises signaling for periodic and semi-persistent sounding reference signal transmissions.

20. An apparatus comprising:
a processor that:
aggregates a plurality of serving cells;
determines that a power headroom report is triggered;
determines that an uplink resource for a new transmission on a serving cell of the plurality of serving cells is allocated at a first time after the power headroom report is triggered, wherein the uplink resource for the new transmission allocated at the first time is a configured grant;
determines a power headroom value for each serving cell of the plurality of serving cells being activated based on information received prior to and including a predetermined time before the start of the uplink resource at the first time, wherein the information comprises downlink control information, higher layer signaling for configured grants, an uplink resource allocation for the configured grants, and signaling for sounding reference signal transmissions;

generates a power headroom report medium access control control element comprising at least the power headroom value for each serving cell of the plurality of serving cells being activated; and transmits the power headroom report medium access control control element on the uplink resource allocated at the first time.

21. The apparatus of claim 20, wherein the processor determining the power headroom value for each serving cell of the plurality of serving cells comprises the processor determining whether the power headroom value for each serving cell of the plurality of serving cells being activated is based on a real uplink transmission or a virtual uplink transmission.

* * * * *